UNITED STATES PATENT OFFICE.

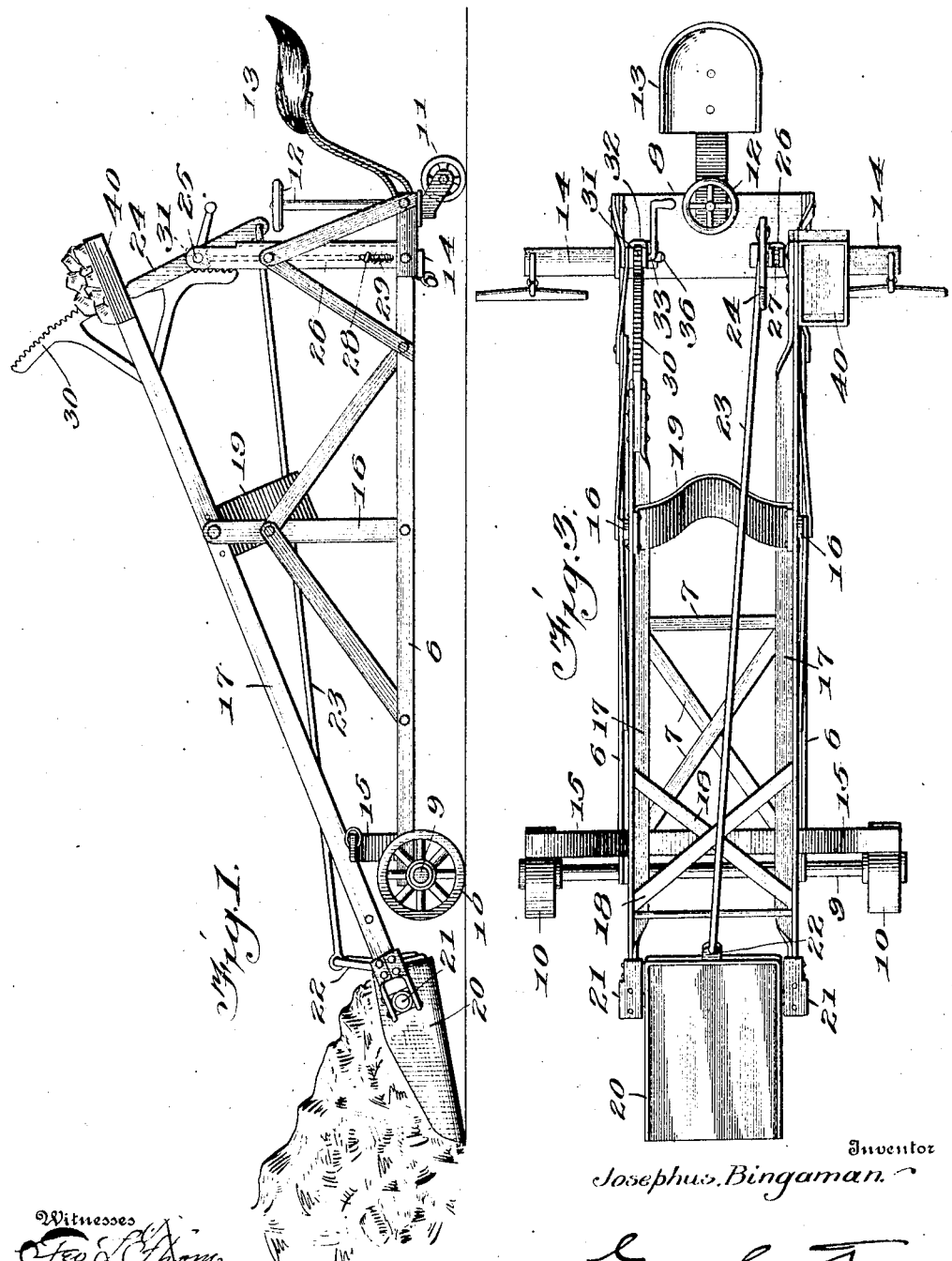

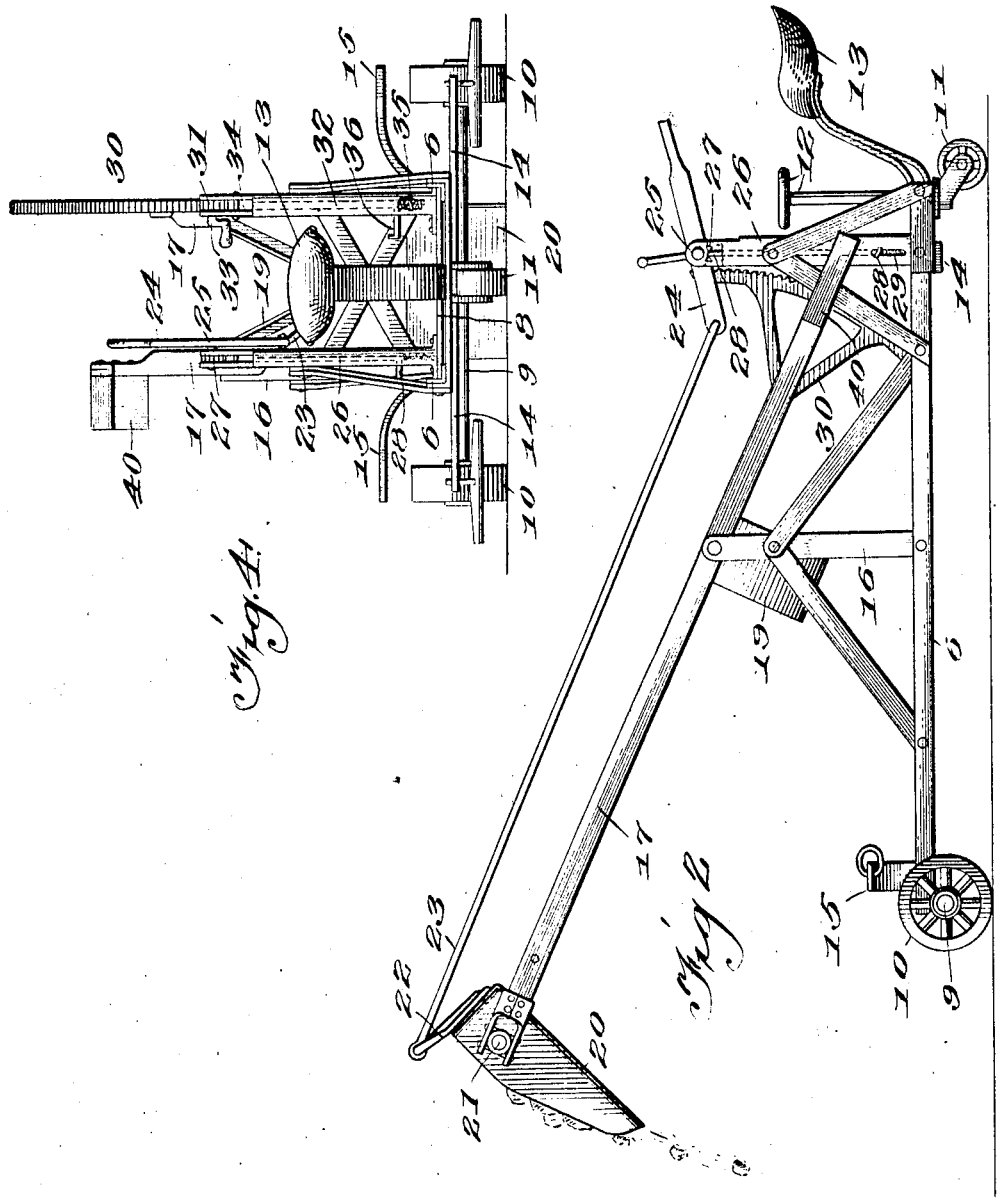

JOSEPHUS BINGAMAN, OF GARNETT, KANSAS, ASSIGNOR OF ONE-HALF TO GEORGE W. HUNLEY, OF GARNETT, KANSAS.

EXCAVATING AND LOADING MACHINE.

No. 909,982.

Specification of Letters Patent.

Patented Jan. 19, 1909.

Application filed July 17, 1908. Serial No. 444,030.

*To all whom it may concern:*

Be it known that I, JOSEPHUS BINGAMAN, a citizen of the United States, residing at Garnett, in the county of Anderson and State of Kansas, have invented certain new and useful Improvements in Excavating and Loading Machines, of which the following is a specification.

This invention is a machine for excavating and loading dirt, manure, hay, cane, and the like, and its principal object is to provide improved means for manipulating the machine and for controlling and operating a tilting beam or frame which carries a dumping shovel, fork, or the like, for lifting and dumping the material.

The machine is characterized by lightness and simplicity of construction, and requires but one man for its operation, including the control of the team used to draw the same.

The construction and features of the invention will be more fully evident from the following description and the accompanying drawings, in which—
Figure 1 is a side elevation of the machine in one position; Fig. 2 is a similar elevation in another position; Fig. 3 is a top plan view; and Fig. 4 is a rear end view.

Referring specifically to the drawings, the lower or supporting frame of the machine consists of substantially parallel longitudinal bars 6 connected across at the front by braces 7 and having a platform 8 at the rear. This frame is mounted on an axle 9 at the front, carried by wheels 10. At the rear it has a caster wheel 11 controlled by a steering post and wheel 12 in convenient position in front of the seat 13. The team is attached with one horse at each side to a cross bar 14 at the rear, each horse being attached or yoked to an arm 15 at the front.

At or about the middle of the frame is a pair of braced posts 16 to or between which the tilting beam is pivoted. This beam consists of side bars 17 and cross braces 18 and 19, the latter being bent down or dropped to be out of the way of the rod for operating the shovel 20. This shovel is pivoted at 21 between the front ends of the bars 17. A fork or the like may be used instead of the shovel, for handling hay or such material. The shovel is connected by an arm 22 and rod 23 to a lever 24. This lever is fulcrumed at 25 at the head of a hollow standard 26 mounted on the platform 8, at the left hand side. The pivot 25 to which the lever is fixed extends across the standard and is provided in the recess thereof with a ratchet wheel 27 which is adapted to be engaged by a detent 28, comprising a rod which is slidable up and down in the hollow of the standard. This rod is bent out or offset at its lower end through a slot in the side of the standard, as indicated at 28. The detent is normally pressed upwardly into engagement with the ratchet wheel by a spring 29, but may be disengaged by the pressure of the foot of the operator on the foot-piece 28; and when the detent is disengaged the lever 24 may be operated to dump the shovel.

One of the side bars 17 of the tilting beam has a segmental rack 30 at the rear end thereof which moves in engagement with a pinion 31 set in the top of a hollow standard 32 at the side of the platform opposite to the standard 26. The pinion 31 is mounted on a crank shaft 33 which may be turned by the operator, and thereby the tilting beam is raised or lowered to lift or drop the shovel.
The pinion is normally locked by a detent 34 slidable up and down in the standard 32, being pressed up by a spring 35 at the bottom. The detent 34 is offset at its lower end to form a foot-piece 36 extending through a slot in the standard in convenient position to receive the pressure of the foot of the operator, whereby the detent may be disengaged from the pinion, allowing the same to run free, or to be operated by the hand-crank. The tilting beam is provided with a box 40 to receive weights to counter-balance the weight at the front end of the beam.

In operation, the front end of the beam is tilted down to lower the shovel, and the team is advanced to drive the shovel into the pile of material, and when the shovel is loaded the crank 33 is operated by the driver and the front end of the beam and the shovel are lifted, and the machine may then be drawn by the team to the dump, and the shovel is dumped by manipulation of the lever 24. As stated, a fork may be substituted for the shovel for handling hay. The tilting beam may be elevated to any desired extent to pile dirt or manure or stack hay. The machine may be used, for instance, for distributing manure from a pile in the field, and generally for excavating and transporting dirt. The team and machine may be backed, by reason of the connection at the_ front with the arms 15. The frame of the machine and the tilting beam are preferably made of structural iron, so as to be light and strong.

Various modifications may be made in the structure, which is not limited to the special form shown and described, nor otherwise than is indicated in the following claims.

I claim:

1. The combination of a wheeled frame having draft devices at opposite sides thereof for attachment of draft animals, a tilting beam pivoted on the frame and having a lifting and dumping implement at the front end thereof, means to operate the beam, and means to operate the implement.

2. The combination of a wheeled frame, a tilting beam pivoted thereon and projecting beyond the front end thereof, a lifting and dumping implement carried at the front end of the beam, a segmental rack at the rear end of the beam, and a crank shaft mounted on the frame and having thereon a pinion meshing with the rack, to tilt the beam.

3. The combination of a wheeled frame, a tilting beam pivoted thereon and provided at its front end with an implement and at its rear end with a segmental rack, a standard mounted on the frame at the rear, a crank shaft carried in bearings on the standard and having thereon a pinion in mesh with the rack, and a detent mounted in a guide on the standard and normally engaging the rack to lock the same.

4. The combination of a wheeled frame, a tilting beam pivoted thereon and provided at its front end with an implement and at its rear end with a segmental rack, a standard mounted on the frame at the rear, a crank shaft carried in bearings on the standard and having thereon a pinion in mesh with the rack, and a detent slidable up and down on the standard and normally engaging the pinion at its upper end and having an offset foot piece at its lower end, for the purpose stated.

5. The combination of a frame, a supporting axle and wheels at the front end thereof, a steering wheel at the rear end, draft devices at opposite sides of the frame, behind the front wheels, and excavating and dumping devices mounted upon the frame.

6. The combination of a frame, a tilting beam thereon, a lifting and dumping implement pivotally mounted at the front end of the beam, and a lever mounted on the rear end of the frame and connected to the implement to operate the same.

In testimony whereof, I affix my signature in presence of two witnesses.

JOSEPHUS BINGAMAN.

Witnesses:
ONA GARRISON,
ALICE JOHNSON.